(12) United States Patent
Breuer et al.

(10) Patent No.: US 7,405,556 B2
(45) Date of Patent: Jul. 29, 2008

(54) MAGNETIC ENCODER SYSTEM WHEREIN A FIRST SUBSTRATE IS PROVIDED WITH A SECOND SUBSTRATE WHICH ROTATABLY ENGAGES THE MAGNETIC MEDIUM

(75) Inventors: Marcus Breuer, Dahlheim (DE); Hubert Grimm, Mommenheim (DE); Hans-Guenter Kraemer, Wittlich (DE); Nikolaus Luckner, Ober-Olm (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/536,823

(22) Filed: Sep. 29, 2006

(65) Prior Publication Data

US 2007/0019336 A1 Jan. 25, 2007

Related U.S. Application Data

(63) Continuation of application No. 10/982,210, filed on Nov. 5, 2004, now Pat. No. 7,141,965.

(30) Foreign Application Priority Data

Nov. 26, 2003 (DE) .................................. 03104379

(51) Int. Cl.
*G01B 7/30* (2006.01)

(52) U.S. Cl. .............................. 324/207.21; 324/207.25; 324/252

(58) Field of Classification Search ................................
324/207.14–207.17, 207.2–207.25, 173–174,
324/252; 338/32 H, 32 R
See application file for complete search history.

(56) References Cited

U.S. PATENT DOCUMENTS

| 3,278,838 | A | * | 10/1966 | Behr et al. | 324/212 |
| 4,849,680 | A | * | 7/1989 | Miyamoto | 318/602 |
| 5,757,180 | A | * | 5/1998 | Chou et al. | 324/207.2 |
| 5,825,181 | A | * | 10/1998 | Schaenzer et al. | 324/212 |
| 6,313,460 | B1 | * | 11/2001 | Haas et al. | 250/231.13 |
| 2002/0151085 | A1 | * | 10/2002 | Zaffaroni et al. | 436/180 |
| 2003/0182788 | A1 | * | 10/2003 | Fayeulle et al. | 29/603.09 |

\* cited by examiner

*Primary Examiner*—Jay M Patidar
(74) *Attorney, Agent, or Firm*—Zilka-Kotab, PC

(57) ABSTRACT

A magnetic encoder system according to one embodiment includes a magnetic sensor mounted on a first substrate above a magnetic medium, the magnetic medium carrying at least one magnetic track, the sensor detecting changes in the magnetic track during a relative movement between the sensor and the magnetic medium. The first substrate is provided with a second substrate rotatably engaging the magnetic medium.

13 Claims, 2 Drawing Sheets

MAGNETIC ENCODER SYSTEM WHEREIN A FIRST SUBSTRATE IS PROVIDED WITH A SECOND SUBSTRATE WHICH ROTATABLY ENGAGES THE MAGNETIC MEDIUM

RELATED APPLICATIONS

This application is a continuation of U.S. patent application Ser. No. 10/982,210, filed Nov. 5, 2004 now U.S. Pat. No. 7,141,965.

FIELD OF THE INVENTION

The present invention relates to a high-resolution magnetic encoder system, and more particularly, this invention relates to a high-resolution magnetic encoder implementing GMR or TMR technology.

BACKGROUND OF THE INVENTION

Devices for quantative detection of linear and rotary movements are known. Optical encoders are used to detect the rotation angle or, respectively, a length and a direction of a rotary movement or, respectively, linear movement of moving bodies. The essential components of such a device are the emitter system, a grid plate, normally a grid disk or a grid straight edge, and the detector system. The emitter system normally contains a light emitting diode (LED). The light beam emitted from the light emitting diode or laser diode is modulated by the grid plate. The grid plate is connected to a moving body and has a periodic opening pattern. The detector system detects the transmitter signal (modulated by the grid plate) from the laser diode and, at the output, supplies information relating to the light beam and the direction of movement.

High-resolution magnetic encoders using Hall sensors are also known. As well, magnetic encoders (magneto-electric converters) which employ a magnetoresistance effect element made of a thin ferromagnetic film, have been commonly used in various fields due to their good durability in a surrounding atmosphere, wide operational temperature range and high response frequency. For example, magnetic encoders are used for controlling the rotational speed of a capstan motor in a video tape recorder or the like. Generally speaking, magnetic encoders are used for positional or speed control in factory automation (FA) equipments, such as servomotors, robots and the like, or in office automation (OA) equipments, such as computer-printers and copying machines. In recent years, there has been an increasing demand for improving the accuracy of such equipments. In general the magnetic encoder includes a magnetic recorder and a magnetic sensor disposed in opposition to the magnetic recorder. The magnetic recorder comprises a non-magnetic substrate and a recording medium which is a permanent magnetic material coated on the peripheral or flat surface of the non-magnetic substrate. The recording medium is magnetized in a multipolar fashion at a magnetizing pitch $\lambda$ to form at least one magnetic signal track.

A hard disk drive (HDD) is a digital data storage device that writes and reads data via magnetization changes of a magnetic storage disk along concentric information tracks. During operation of the HDD, the disk is rotated at speeds in the order of several thousand revolutions-per-minute (RPM) while digital information is written to or read from its surface by one or more magnetic transducers. To perform an access request, the HDD first positions the sensor and/or write head, also referred to as a "read/write head", at the center of the specified data track of the rotating disk.

During operation of the HDD, the read/write head generally rides above the disk surface on a cushion of air, caused by an "air bearing surface", that is created by the movement of the disk under the head. The distance between the read/write head and the disk surface while riding, or partially riding, on the air cushion is referred to as the "flying height" of the head.

Further, the head is carried by a "slider" which is supported by hydrodynamic lift and sink forces. These lift forces are given by the interaction of air streaming underneath the surface structure of the slider.

To build encoder applications with high resolution, it is important to minimize the gap between the sensor and the information track.

As the air bearing surface varies with the rotation speed, using air pressure as with the HDD applications is not possible if the variation of the relative movement is too high.

The known optical encoders are limited to a small temperature range due to high sensitivity of the used sensor/encoder-optics to temperature changes. The resolution of these encoders is also very sensitive to dust and humidity of the environment.

Hall sensors are very sensitive to temperature changes and thus can also not be used in a wide temperature range as required in the field of automotive applications, industrial applications or the like.

What is therefore needed is a high-resolution magnetic encoder system that overcomes the disadvantages of the prior art systems.

SUMMARY OF THE INVENTION

A magnetic encoder system according to one embodiment includes a magnetic sensor mounted on a first substrate above a magnetic medium, the magnetic medium carrying at least one magnetic track, the sensor detecting changes in the magnetic track during a relative movement between the sensor and the magnetic medium. The first substrate is provided with a second substrate rotatably engaging the magnetic medium.

A magnetic encoder system according to another embodiment includes multiple magnetic sensors mounted on a first substrate above a magnetic medium, said magnetic medium carrying at least one magnetic track, said sensors detecting changes in said at least one magnetic track during a relative movement between said sensors and said magnetic medium, wherein said first substrate rotatably engages said magnetic medium.

Other aspects and advantages of the present invention will become apparent from the following details description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The rotary magnetic encoder system of the present invention uses a magnetic medium on a substrate and a magnetic sensor. In a preferred embodiment the magnetic media is a magnetic layer deposited on a substrate. This substrate must be rigid and can be selected from the group consisting of plastics, ceramic, silicon and glass. A protective layer covers the magnetic media and will help to adjust the distance (gap) between the at least one magnetic track provided on the magnetic media and the magnetic sensor. In a preferred embodiment, the magnetic sensor is a GMR (Giant Magneto-Resistive) or a TMR (Tunneling Magneto-Resistive) sensor of the type standard in the HDD art. The sensor has no contact with the magnetic media and the whole system may be encapsulated.

Figure 1:
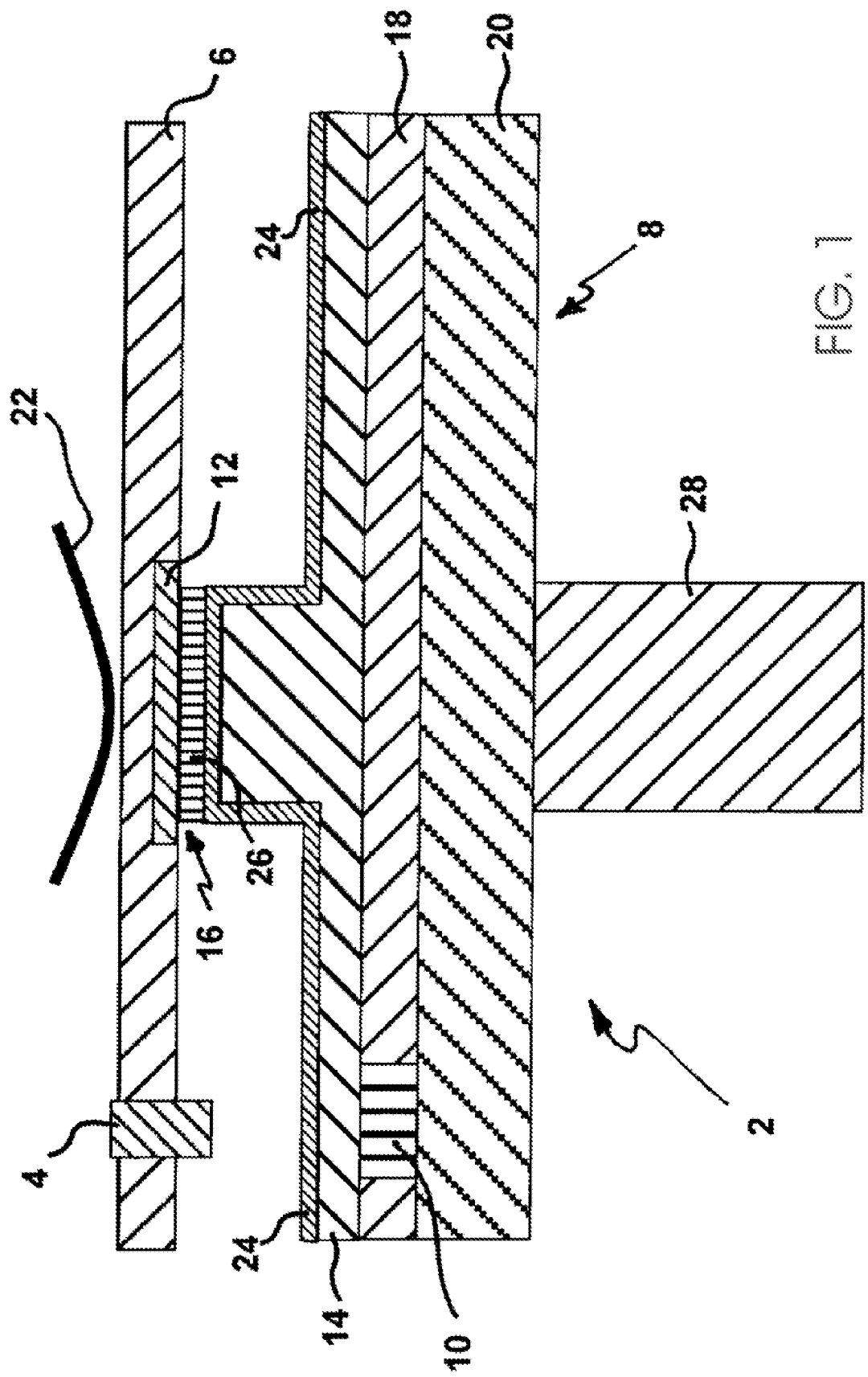
FIG. 1 schematically depicts and embodiment of the inventive magnetic encoder.

FIG. 1 shows a preferred embodiment of the inventive magnetic encoder system 2. A magnetic sensor 4 is mounted on a first substrate 6 arranged above a magnetic medium 8. The first substrate 6, which may be, e.g., a circuit board or the like is provided with a small second substrate 12, e.g., a small disk rotatably carrying or operatively engaging a protective layer 14, e.g., $Al_2O_3$. The small disk 12 is inserted in the first substrate 6 in the area of the contact area 16 with magnetic medium 8. In a special embodiment shown in the figure, pressure elements 22 are provided which are adapted to press the first substrate 6 smoothly in the direction of the magnetic media 8. The pressure elements may either be a spring as shown, a pneumatic/hydraulic pressure element or the like. In case the sensor is sensitive enough, i.e., the expected resolution is low, the encoder may also work without any pressure element. For such a low-resolution encoder, the housing of the encoder only has to ensure that the maximum air gap between the encoder disk and the sensor-part is limited with regard to the signal/noise-ratio of the sensor.

In the present example, the magnetic medium 8 is a rotatable disk 20 acting as a third substrate on which a magnetic layer 18 is deposited. The magnetic layer 18 carries at least one magnetic track 10. The protective layer 14 covers the magnetic layer 18. Note that additional layers (not shown) can also be included in the magnetic medium 8.

The rotatable disk 20 is mounted on a shaft 28 which is connected to the external device (not shown), e.g., a motor, spindle, gear, or the like, the rotation of which is to be evaluated. Illustrative devices that can implement the system include magnetic storage systems, FA equipment, OA equipment, etc.

It should be mentioned that the system 2 is adapted to allow a relative movement of the magnetic medium 10 with respect to the sensor 4, i.e., either the first substrate 6 or the magnetic medium 20 can be rotated or moved relative to the other. As the sensor 4 rotates with relation to the magnetic media 8, or vice versa, data written in the magnetic track(s) 10 causes a measurable change in an electrical current passing through the sensor 4. Where the position of the data on the disk 20 is known, positional as well as velocity data of the disk 20 relative to the sensor 4 is determinable. And because of the high data density per track 10 that can be read with GMR and TMR sensors 4, very precise positional and rotational information can be obtained.

A rotation of the first substrate 6 to which the magnetic sensor 4 is attached may be difficult due to the evaluation unit and the respective leads attached to the substrate, however, in case the respective connections are realized without actual physical leads, e.g., wireless, or with brushes and contact tracks, this can be done very easily.

The contact area 16 can include a structure that allows for adjusting the distance between the sensor 4 and the magnetic media 8, based on the biasing exerted by the biasing element 22. The structure can be shaped by common photolithographic and etching processes (e.g., applying photoresist, printing a suitable photomask, developing photoresist, dry etching parts of the structure that are no longer covered with photo resist, stripping resist).

The magnetic medium 8 is covered with a hard sandwich layer 24, being made of a durable material, e.g., SiN or SiC. A lubricant layer 26, is applied on top of the hard sandwich layer 24 to reduce friction on between the hard sandwich layer 24 covering the media 8 and the second substrate 12. The lubricant may be selected from the group consisting of long chain hydrocarbons, MoS, MoSe, polytetrafluoroethylene (PTFE or Teflon), perfluoropolyether (PFPE), and the like. The same hard sandwich layer 24 preferably covers the small disk 12 in the area of the contact area 16 (not shown).

Figure 2:
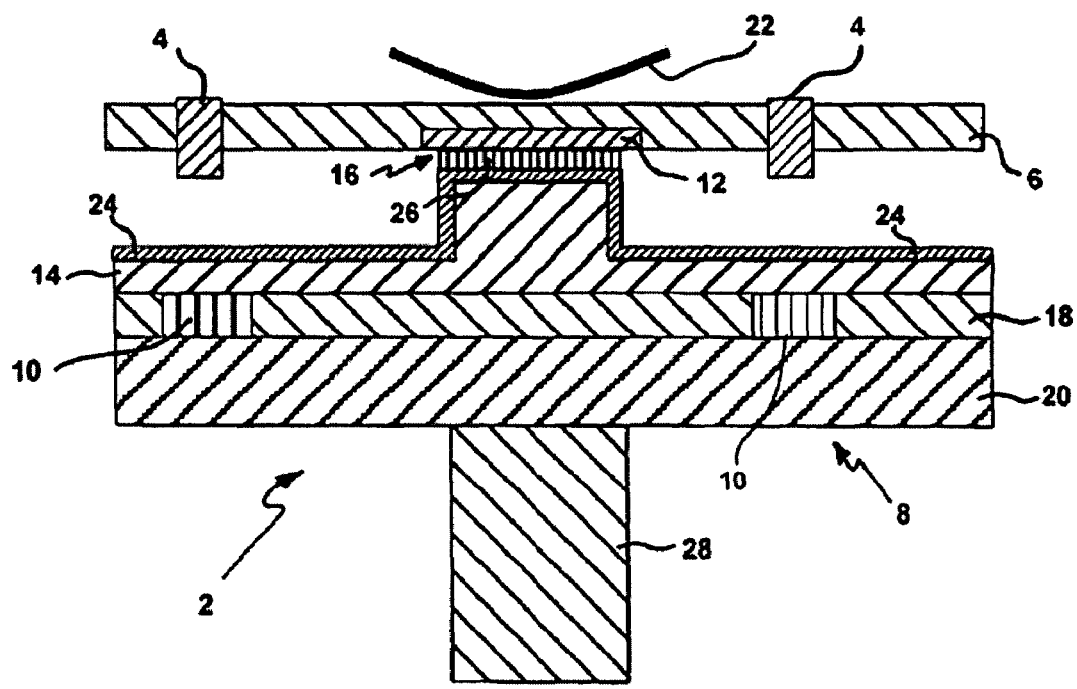
FIG. 2 schematically depicts an embodiment of the inventive magnetic encoder.

FIG. 2 schematically depicts another embodiment of a magnetic encoder having multiple sensors 4, 30.

The inventive system has the advantage that, due to the GMR technology used, high temperature resistivity/stability can be achieved and, at the same time, abrasion between the sensor and the magnetic layer is avoided.

Further advantages of the proposed solution are that the system is highly shock- and vibration-resistant since there is no need of precise aligned optical elements inside the encoder package, and that high signal amplitudes can be achieved due to wide magnetic tracks, since the resolution of the encoder is not limited by the radial dimension of the magnetic pattern and the low spacing between sensor and magnetic medium.

Furthermore, the system is able to work in start-stop-mode, both rotation directions and variable rotation speeds—depending on the application of the encoder.

In addition, depending on the number of magnetic tracks and sensors, not only incremental rotary information can be detected, but also absolute angles can be measured with an encoder built with multiple magnetic tracks. Since there is no optical diffraction limit, the magnetic pattern on the disk can be written with higher areal density compared to optical systems leading to a higher resolution.

Further advantages are that the GMR sensitivity is not affected by humidity (condensation in environments with high humidity is not an issue as it is for optical encoders) or dusty environment and that the encoder system is scalable to higher resolution. Due to the ion beam technology and the low magnetic spacing the magnetic bit can be very small. Enlarging the bit size, which lowers the resolution, is not an issue. Therefore the encoder resolution is scalable over several orders of magnitude.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic encoder system, comprising:
    a magnetic sensor mounted on a first substrate above a plane of a magnetic medium, the plane extending through a majority of an outer periphery of the magnetic medium, said magnetic medium carrying at least one magnetic track, said sensor detecting changes in said magnetic track during a relative movement between said sensor and said magnetic medium, wherein said first substrate is provided with a second substrate rotatably engaging said magnetic medium.

2. The magnetic encoder system according to claim 1, wherein a position of the magnetic sensor on the first substrate is fixed.

3. The magnetic encoder system according to claim 1, wherein the magnetic medium is nonrotatably fixed, wherein the first substrate rotates relative to the second substrate.

4. The magnetic encoder system according to claim 1, wherein a relative rotation between the first substrate and the magnetic medium occurs in both rotation directions.

5. The magnetic encoder system according to claim 1, wherein a relative rotation speed between the first substrate and the magnetic medium is variable.

6. The magnetic encoder system according to claim 1, wherein the magnetic sensor is spaced from the magnetic medium.

7. The magnetic encoder system according to claim 6, wherein the magnetic sensor never contacts the magnetic medium.

8. The magnetic encoder system according to claim 6, wherein a spacing between the magnetic sensor and the magnetic medium is variable.

9. The magnetic encoder system according to claim 1, wherein the magnetic sensor is a read/write magnetic head.

10. The magnetic encoder system according to claim 1, wherein GMR technology is used to form the magnetic sensor.

11. The magnetic encoder system according to claim 1, wherein TMR technology is used to form the magnetic sensor.

12. The magnetic encoder system according to claim 1, wherein a spacing between the magnetic sensor and the magnetic medium varies according to a biasing exerted on the first substrate toward the magnetic medium.

13. A magnetic encoder system, comprising:

a magnetic sensor mounted on a first substrate above a magnetic medium, said magnetic medium carrying at least one magnetic track, said sensor detecting changes in said magnetic track during a relative movement between said sensor and said magnetic medium, wherein said first substrate is provided with a second substrate rotatably engaging said magnetic medium, wherein the magnetic sensor is spaced from the magnetic medium, wherein a spacing between the magnetic sensor and the magnetic medium is variable, wherein the spacing between the magnetic sensor and the magnetic medium varies according to a biasing exerted on the first substrate toward the magnetic medium.

* * * * *